June 2, 1953

F. M. FRAGA 2,640,708

COMBINATION HITCH

Filed May 2, 1950

Inventor
Frank M. Fraga

ATTORNEYS

June 2, 1953 F. M. FRAGA 2,640,708
COMBINATION HITCH
Filed May 2, 1950 3 Sheets-Sheet 2

INVENTOR
Frank M. Fraga
BY
ATTORNEYS

June 2, 1953  F. M. FRAGA  2,640,708
COMBINATION HITCH

Filed May 2, 1950  3 Sheets-Sheet 3

Inventor
Frank M. Fraga
By
ATTORNEYS

Patented June 2, 1953

2,640,708

UNITED STATES PATENT OFFICE 2,640,708

COMBINATION HITCH

Frank M. Fraga, Fresno, Calif.

Application May 2, 1950, Serial No. 159,537

8 Claims. (Cl. 280—33.1)

1

The present invention is directed to, and it is a major object to provide, a novel combination hitch for coupling an agricultural implement to a tractor in draft relation.

Another important object of the invention is to provide a combination hitch which is especially useful in connection with sundry types of implements; the hitch being adjustable to different positions or settings for the best operation of, and to obtain the most effective results from, each type of implement.

A further object of the invention is to provide a combination hitch, as above, which includes a pair of transversely spaced, rearwardly projecting draft arms, and a novel connection assembly coupling said arms, in adjustable relation, to the tractor adjacent its rear axle.

An additional object of the invention is to provide a combination hitch, as in the preceding paragraph, wherein the connection assembly may be set, selectively and dependent upon the type of implement or working conditions, for unrestrained lateral swinging of the draft arms relative to the tractor and about transversely spaced points adjacent the rear axle; for unrestrained lateral swinging of the draft arms relative to the tractor and about a central point adjacent the rear axle but locked against lateral swinging about the aforesaid laterally spaced points; for mechanically offsetting the draft arms to right or left while permitting the aforesaid lateral swinging about said transversely spaced points; and so that the structure as a whole may swing freely as a rigid unit to right or left about said central point. The purpose of these several positions of adjustment will hereinafter appear.

The hitch structure also provides for the self-leveling of the implement, especially a wide one, when working lengthwise of furrows or in uneven ground, so as to prevent interference with steering when one side of the implement strikes relatively hard soil or high spots thereon.

It is also an object of the invention to provide a combination hitch which is simple in structure; designed for ease and economy of manufacture; and when in use being capable of ready and convenient manual adjustment to the selective working positions, all of the parts being retained at all times in a unitary assembly.

Still another object of the invention is to provide a practical and reliable combination hitch, and one which will be exceedingly effective for the purpose for which it is designed.

These objects are accomplished by means of such structure and relative arrangement of parts as will fully appear by a perusal of the following specification and claims.

Figure 1:
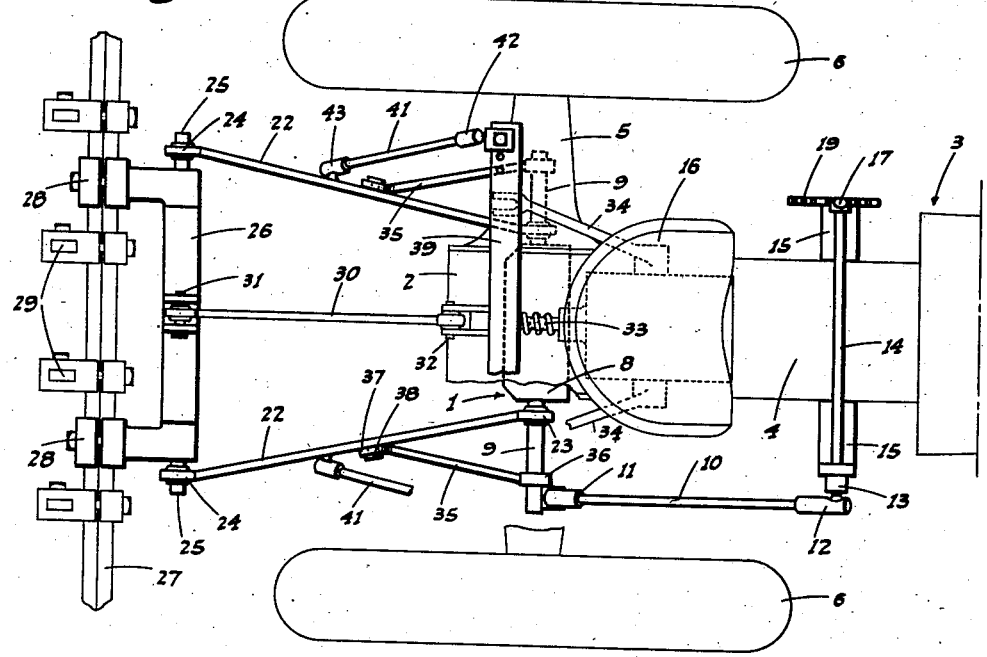
Fig. 1 is a top plan, partly broken away, of the hitch.
Figure 2:
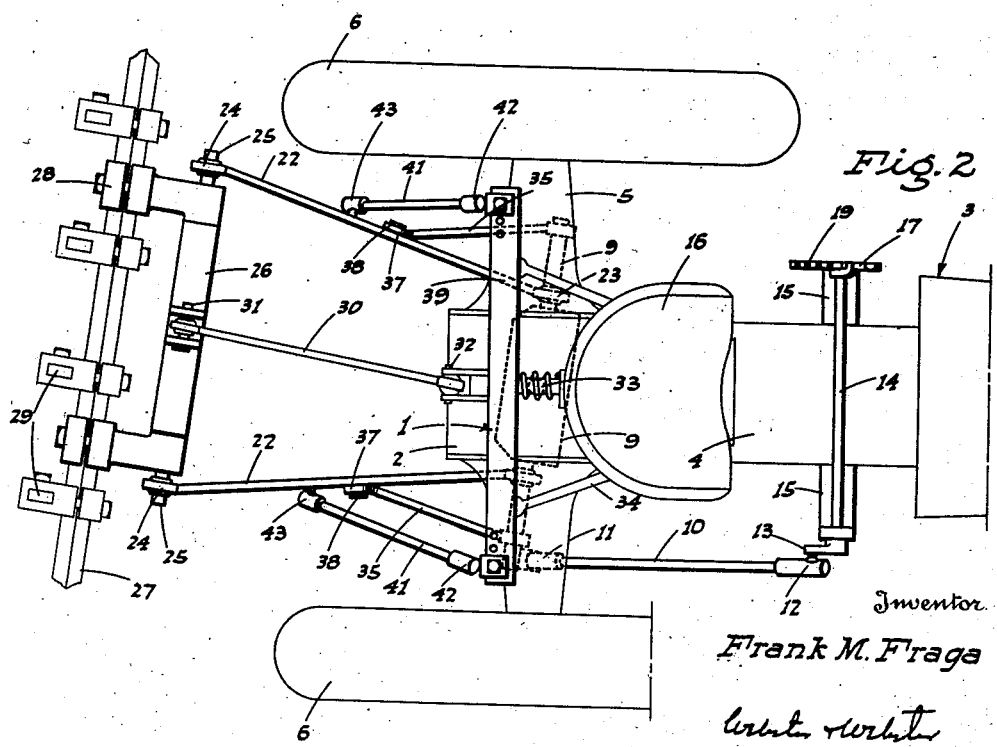
Fig. 2 is a similar view showing the hitch swing as a rigid unit about the central pivot point, as when the tractor and implement are making a turn.

Referring now more particularly to the characters of reference on the drawings, the novel combination hitch comprises a fifth wheel assembly, indicated generally at 1, adapted to be secured to the under side of the differential housing 2 of a wheel-type tractor, indicated generally at 3; the tractor including a body 4, rear axle housings 5 which extend in opposite directions from the differential housing 2, and rubber tired, rear wheels 6.

The fifth wheel assembly 1 includes a vertical pivot bolt 7, and a rotary plate 8; there being elongated trunnions 9 fixed to the rotary plate 8 and projecting from opposite sides thereof; i. e. laterally of the direction of travel.

The rotary plate 8 is adapted to be adjusted and held in the position of adjustment, or permitted to freely turn, by means of the following structural arrangement.

A control rod 10 is connected, at its lower end, by a swivel joint 11, to the outer end of one of the trunnions 9, and thence said control rod 10 extends at a forward and upward incline alongside the tractor body 4 to connection, by means of a swivel joint 12, with the outer end of a radial lever arm 13 on a cross shaft 14 supported from the body 4 by a bracket 15.

Figure 4:
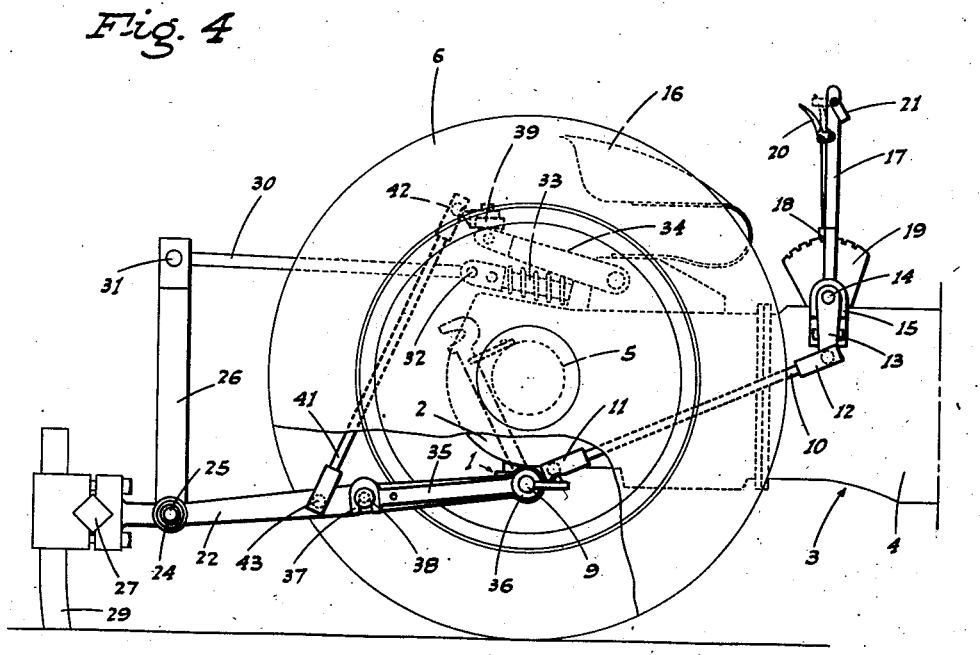
Fig. 4 is a side elevation of the hitch with the parts as in Fig. 1.
Figure 5:
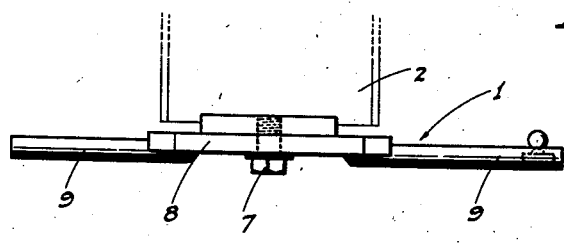
Fig. 5 is an enlarged elevation of the fifth wheel assembly.
Figure 6:
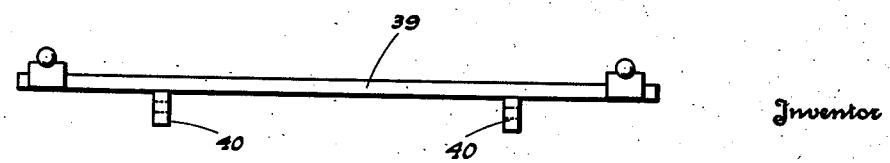
Fig. 6 is an enlarged elevation of the extension bar for the lift arms, detached.

The cross shaft 14 is disposed above and intersects the tractor body 4 ahead of the operator's seat 16, and at the end opposite the radial lever arm 13 the cross shaft 14 is fitted with an upstanding lever handle 17 which carries a spring-pressed latch device 18 cooperating with an adjacent notched quadrant 19. The latch device 18 includes a latch release lever 20 adjacent the upper end of the handle 17. The lever 20 is adapted to be held, when desired, in release position, by means of a bail 21 on the handle 17. To hold the latch device 18 open, for a period of time and against the spring of said device, the lever 20 is swung toward the handle 17 and engaged within the bail 21 in the manner shown in dotted lines in Fig. 4.

When the latch release lever 20 is held in its released position, as above, the rotary plate 8 of the fifth wheel assembly is free to float. However, when the lever 20 is not secured by the bail 21 the latch device 18 is effective to secure the handle 17, and consequently the rotary plate 8, fixedly in any selected angled position of adjustment, causing the implement to shift to a correspondingly offset and angled position to right or left.

A pair of draft arms 22 project rearwardly in diverging relation from corresponding ones of the trunnions 9, and said draft arms are secured, at their forward ends, to such trunnions adjacent the inner portions of the latter by means of swivel couplings 23.

At their outer ends the draft arms 22 are connected, by swivel couplings 24, to trunnions 25 which project laterally from opposite sides, and adjacent the lower end, of an upstanding A-frame 26. This upstanding A-frame 26 serves as the draft frame for the implement. In the present illustration the implement includes, by way of example, a transverse tool bar 27 secured to the A-frame by clamps 28, with said tool bar supporting earth working tools 29 at spaced points therealong.

A longitudinal top link 30 is pivoted at its rear end, as at 31, to the upper end of the A-frame 26, and said link thence extends forwardly to pivotal connection, as at 32, with a spring-resisted, longitudinally shiftable member 33 on the tractor, which member is included in, and comprises a control for, automatic lift mechanism.

The automatic lift mechanism includes transversely spaced, power actuated lift arms 34 on the tractor above, and corresponding to, the draft arms 22; forward shifting of the member 33 resulting in automatic power lifting of the arms 34, whereas rearward shifting of the member 33 results in lowering of said arms 34. This automatic lift mechanism on the tractor is of the type which is found on the "Ford" or "Ferguson" tractor, now available on the market.

The draft arms 22, as connected by the swivel couplings 23, to the trunnions 9, are capable of unrestrained lateral swinging relative to the tractor and the fifth wheel assembly 1. However, under certain working conditions it is desired to restrain such lateral swinging of the draft arms 22 relative to the fifth wheel assembly 1, and this is accomplished as follows:

Stay bars 35 are connected, at their forward ends, by bearings 36 to outer portions of corresponding trunnions 9; i. e. some distance outwardly of the swivel couplings 23 for the draft arms 22. From the bearings 36 the stay bars 35 extend, in diagonal or rearwardly converging relation, toward said draft arms 22. The stay bars 35 are formed, at their rear ends, with hooks 37 which are adapted to engage, in releasable relation, with headed pins 38 on the draft arm 22 intermediate the ends of the latter. When the hooks 37 are engaged on the pins 38, the stay bars 35 hold the draft arms 22 in rigid relation to the rotary plate 8 of the fifth wheel assembly 1.

Attached to the lift arms 34 is a transverse extension bar 39 connected to the outer ends of the lift arms 34 by means including dependent ears 40; the extension bar 39 projecting some distance laterally outwardly of said arms 34.

Upwardly diverging lift links 41 are connected, by swivel joints 42 and 43, between the outer ends of the extension bar 39 and the draft arms 22 intermediate the ends of the latter. With this arrangement, the power actuated lift arms 34 are effective to raise or lower the draft arms 22.

The hitch—in any of its positions of adjustment, as hereinafter discussed—is capable of permitting drag reaction from the implement to work the longitudinal top link 30 and shiftable member 33, whereby to cause a corresponding automatic motion of the power actuated lift arm 34 in order to raise the implement under high drag conditions and to thereafter lower and return the implement to normal running depth.

The above described combination hitch is capable of being adjusted or set in the following different ways, for use with varied types of implements, and as working conditions require:

When it is desired that the implement trail directly behind the tractor, yet with a long tongue effect; i. e. with the theoretical point of pull, as calculated by extending the draft lines of the arms 22, adjacent the front of the tractor, the fifth wheel assembly is locked in its position, as in Fig. 1, but the stay bars 35 are released. This permits the draft arms 22 to be capable of unrestrained lateral swinging relative to the tractor and said fifth wheel assembly.

With this setting the implement in effect steers with, or follows generally the path of, the front wheels of the tractor; allowing quick response or maneuvering of the implement, which is an advantage in row crop cultivating or the like. Also, the long tongue effect is advantageous when using a wide implement such as a cotton cultivator, or a wide spring tooth harrow.

To attain a short tongue effect, with the hitch coupling the trailing implement for relative pivotal movement about a central point beneath the rear axle; i. e. about the pivot bolt 7, the hitch parts are adjusted as follows:

Firstly, the latch device 18 is released by engaging bail 21 with lever 20; this permitting the plate 8 to freely rotate. Additionally, the stay bars 35 are connected by engaging hooks 37 with pins 38. This is especially useful with implements having relatively great side draft, such as a mold board plow, or a Wheatland plow. As the implement with this setting tends to follow the path of the rear wheels, it is easier to plow a straight line furrow, and additionally, the side draft of the implement does not impair steering of the tractor, as would be the case with the hitch set for a long tongue effect, as aforesaid since any side thrust is imparted to the tractor at a point near the center of the rear axle.

A further advantage of having a central point of pull directly under the rear axle is that there is no tendency to cause the tractor to overturn from front to rear.

Figure 3:
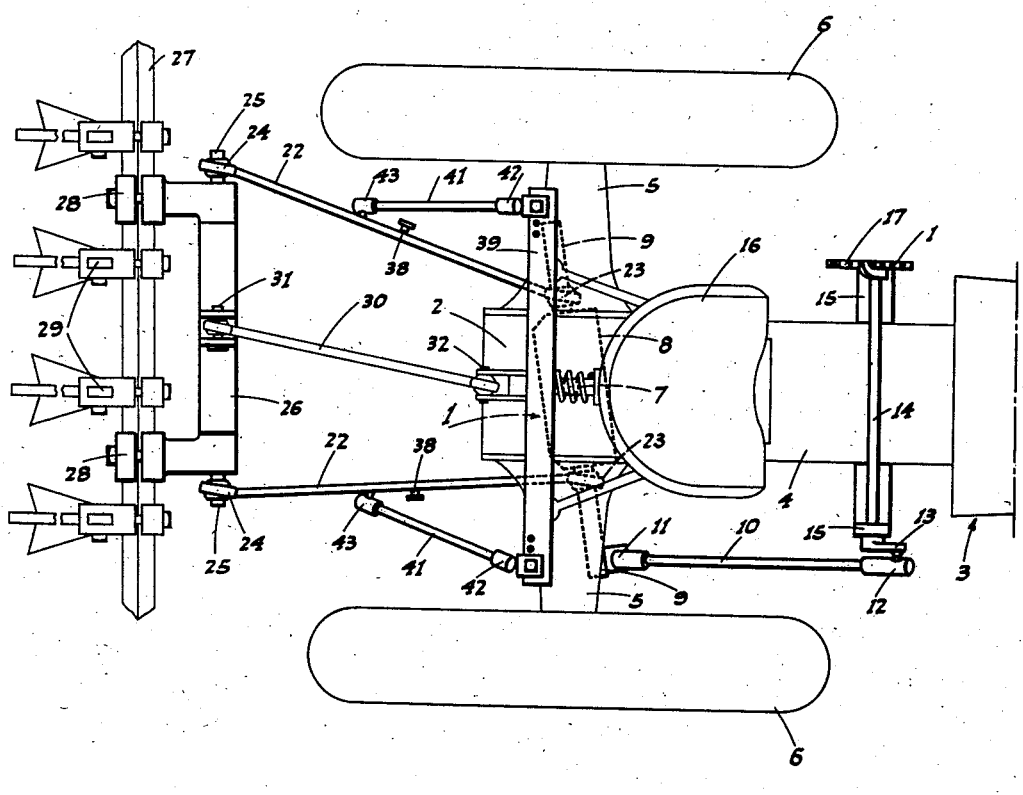
Fig. 3 is a similar view, showing the fifth wheel of the hitch as manually swung in one direction, with the implement correspondingly swung to an offset position.

When it is desired to mechanically offset the trailing implement, such as a disc plow, to right or left, the lever handle 17 is manipulated to cause the rotary plate 8 to turn to a selected position of adjustment, as in Fig. 3, whereupon said handle 17 is latched by the device 18 to the quadrant 19. This causes the implement to be shifted to and maintained in an offset running position, and in which position lateral swinging of the draft arms 22 is permitted; the stay bars 35 being then released.

Not only does adjustment as in the preceding paragraph make possible the mechanical offsetting of the implement, but it is very advantageous when an implement is running on a side hill since it offsets the tendency of the implement to slip down hill.

For pick-up of the entire implement from the ground by the lift arms 34, and for certain operating conditions, both the fifth wheel assembly 1 and the stay bars 35 may be in their locked and engaged positions respectively; the entire hitch being secured in rigid unitary relation for lifting the implement or trailing it in a fixed position.

Another feature of the hitch is that if one side of the trailing implement encounters high drag resistance, such one side will rise under the influence of such high drag resistance and relieve the excessive pull on said side of the tractor. This occurs because of the swivel mounting of the draft arms 22 and the fact that the swivelly connected lift links 41 diverge upwardly; lateral shift of the implement resultant from the excessive drag being translated by said divergent links into rising motion at said one side of the implement.

Since it may be desirable at times to alter the divergence of links 41, the bar 39 is arranged so that the points of connection of said links therewith may be altered.

In general, the invention provides a hitch which is readily adaptable for use with different types of trailing implements, and permits of adjustment of such implements to meet varying working conditions; the hitch thus being universal in its adaptations and ready and convenient to manually adjust to the several settings thereof.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A combination hitch, for coupling a trailing implement to a tractor, comprising a fifth wheel assembly adapted to be mounted on the tractor at the rear, a pair of transversely spaced draft arms projecting rearwardly from and connected to the fifth wheel assembly in laterally swingable relation to the tractor, and means between the tractor and the fifth wheel assembly operative to lock said assembly in selective positions of rotative adjustment.

2. A combination hitch, for coupling a trailing implement to a tractor, comprising a fifth wheel assembly adapted to be mounted on the tractor at the rear, a pair of transversely spaced draft arms projecting rearwardly from and connected to the fifth wheel assembly in laterally swingable relation to the tractor, selectively operating means between the fifth wheel assembly and draft arms to lock the latter against lateral swinging thereof relative to said assembly, and means between the tractor and the fifth wheel assembly operative to lock said assembly in selective positions of rotative adjustment.

3. A combination hitch, for coupling a trailing implement to a tractor, comprising a fifth wheel assembly adapted to be mounted on the tractor at the rear, a pair of transversely spaced draft arms projecting rearwardly from and connected to the fifth wheel assembly in laterally swingable relation to the tractor, selectively operative means between the fifth wheel assembly and draft arms to lock the latter against lateral swinging thereof relative to said assembly, and means between the tractor and the fifth wheel assembly to lock said assembly in positions of rotative adjustment or to permit free rotation of said assembly, selectively.

4. A combination hitch, for coupling a trailing implement to a tractor, comprising a fifth wheel assembly adapted to be mounted on the tractor at the rear, a pair of transversely spaced draft arms projecting rearwardly from and connected to the fifth wheel assembly in laterally swingable relation to the tractor, and selective operative means between the fifth wheel assembly and draft arms to lock the latter against lateral swinging thereof relative to said assembly.

5. A combination hitch, for coupling a trailing implement to a tractor, comprising a fifth wheel assembly adapted to be mounted on the tractor centrally at the rear, the fifth wheel assembly including a rotary part and opposed trunnions projecting laterally therefrom, control means arranged to lock said rotary part in selective positions or permit the part to rotate freely, a pair of transversely spaced draft arms projecting rearwardly from corresponding trunnions, swivel couplings between said trunnions and draft arms, a draft frame adjacent the rear ends of the draft arms, swivel couplings between the draft arms and said draft frame, and selectively operative means to lock the draft arms against lateral swinging relative to said rotary part of the fifth wheel assembly.

6. A combination hitch, for coupling a trailing implement to a tractor, comprising a fifth wheel assembly adapted to be mounted on the tractor centrally at the rear, the fifth wheel assembly including a rotary part and opposed trunnions projecting laterally therefrom, control means arranged to lock said rotary part in selective positions or permit the part to rotate freely, a pair of transversely spaced draft arms projecting rearwardly from corresponding trunnions, swivel couplings between said trunnions and draft arms, a draft frame adjacent the rear ends of the draft arms, swivel couplings between the draft arms and said draft frame, stay bars adapted to extend diagonally from an outer point on the trunnions to the draft arms intermediate their ends, bearings between the stay bars and corresponding trunnions, and releasable connections between the stay bars and said draft arms.

7. A hitch, as in claim 6, in which the releasable connections each include a hook on the rear end of the corresponding stay bar, and a hook engaging element on the adjacent draft arm.

8. A combination hitch, for coupling a trailing implement to a tractor, comprising a fifth wheel assembly adapted to be mounted on the tractor centrally at the rear, the fifth wheel assembly including a rotary part and opposed trunnions projecting laterally therefrom, an upstanding hand lever on the tractor ahead of the fifth wheel assembly, a control mechanism between the hand lever and said rotary part, means to latch the hand lever in selective positions, and means to hold said latching means ineffective.

FRANK M. FRAGA.

References Cited in the file of this patent

UNITED STATES PATENTS

| Number | Name | Date |
|---|---|---|
| 1,268,808 | Gamble | June 4, 1918 |
| 1,637,811 | Ferguson | Aug. 2, 1927 |
| 1,916,945 | Ferguson | July 4, 1933 |
| 2,271,533 | Altgelt | Feb. 3, 1942 |
| 2,324,868 | Mott | July 20, 1943 |
| 2,336,410 | McKay | Dec. 7, 1943 |
| 2,338,334 | Kastenschmidt | Jan. 4, 1944 |
| 2,414,114 | Martin | Jan. 14, 1947 |
| 2,480,387 | Smith | Aug. 30, 1949 |